US009871886B2

(12) United States Patent
Wang et al.

(10) Patent No.: US 9,871,886 B2
(45) Date of Patent: Jan. 16, 2018

(54) CONTEXTUALIZED INFORMATION BUS

(71) Applicant: Futurewei Technologies, Inc., Plano, TX (US)

(72) Inventors: Guo-Qiang Wang, Santa Clara, CA (US); Ravishankar Ravindran, San Jose, CA (US)

(73) Assignee: Futurewei Technologies, Inc., Plano, TX (US)

(*) Notice: Subject to any disclaimer, the term of this patent is extended or adjusted under 35 U.S.C. 154(b) by 676 days.

(21) Appl. No.: 14/149,558

(22) Filed: Jan. 7, 2014

(65) Prior Publication Data

US 2014/0195641 A1    Jul. 10, 2014

Related U.S. Application Data

(60) Provisional application No. 61/749,639, filed on Jan. 7, 2013.

(51) Int. Cl.
*H04L 29/08* (2006.01)
*H04L 12/715* (2013.01)

(52) U.S. Cl.
CPC .......... *H04L 67/327* (2013.01); *H04L 45/04* (2013.01)

(58) Field of Classification Search
None
See application file for complete search history.

(56) References Cited

U.S. PATENT DOCUMENTS

| 8,099,513 B2 | 1/2012 | Van Oldenborgh et al. |
| 2012/0281540 A1 | 11/2012 | Khan et al. |
| 2012/0317307 A1* | 12/2012 | Ravindran ......... H04L 12/6418 709/238 |

(Continued)

FOREIGN PATENT DOCUMENTS

| CN | 101473598 A | 7/2009 |
| CN | 102045252 A | 5/2011 |

(Continued)

OTHER PUBLICATIONS

Foreign Communication From a Counterpart Application, European Application No. 14703945, European Office Action dated May 6, 2016, 5 pages.

(Continued)

*Primary Examiner* — Angela Nguyen
(74) *Attorney, Agent, or Firm* — Conley Rose, P.C.

(57) ABSTRACT

An NE comprising a plurality of physical interfaces configured to communicate to a plurality of remote NEs in an ICN, a receiver coupled to the plurality of physical interfaces and configured to receive a request for a service from a first of the remote NE via the ICN, wherein the service request comprises a requested service name and a requested service context, a memory comprising a service profile comprising a supported service associating with a supported service name and a supported service context, a processor coupled to the memory and the receiver and configured to generate a service response when the requested service name matches the supported service name and the requested service context matches the supported service context, and a transmitter coupled to the processor and the plurality of physical interfaces and configured to transmit the service response to the first NE via the ICN.

20 Claims, 8 Drawing Sheets

(56) References Cited

U.S. PATENT DOCUMENTS

2013/0016695 A1* 1/2013 Ravindran ............ H04L 67/327
370/331
2013/0219081 A1 8/2013 Qian et al.
2013/0282860 A1 10/2013 Zhang et al.

FOREIGN PATENT DOCUMENTS

| CN | 102549988 A | 7/2012 |
|---|---|---|
| CN | 102843286 A | 12/2012 |
| EP | 2736191 A1 | 5/2014 |
| WO | 02069608 A2 | 9/2002 |
| WO | 02091296 A2 | 11/2002 |

OTHER PUBLICATIONS

Jacobson, V., et al., "Networking Named Content," Palo Alto Research Center, CoNEXT, XP-002608160, Dec. 1, 2009, 12 pages.
Braun, T., et al., "Service-Centric Networking," IEEE International Conference on Communications Workshops, Jun. 5, 2011, 6 pages.
Li, L., et al., "Information-Centric Network in an ISP," draft-li-icnrg-icn-isp-01.txt, Oct. 20, 2012, 9 pages.
Foreign Communication From a Counterpart Application, PCT Application No. PCT/US2014/010521, Invitation to Pay Additional Fees dated May 2, 2014, 6 pages.
Foreign Communication From a Counterpart Application, PCT Application No. PCT/US2014/010521, International Search Report dated Aug. 8, 2014, 6 pages.
Foreign Communication From a Counterpart Application, PCT Application No. PCT/US2014/010521, Written Opinion dated Aug. 8, 2014, 7 pages.
Zhang, Y., et al., "ICN Based Architecture for IoT," Standard Contributions, IRTF Contribution, Draft, Winlab, Wireless Information Network Laboratory, Version 1.0, Oct. 2013, 16 pages.
Zhang, Y., et al., "ICN Based Architecture for IoT," ICNRG/IETF 88, Oct. 30, 2013 17 pages.
Foreign Communication From a Counterpart Application, Chinese Application No. 201480004212.5, Chinese Search Report dated May 22, 2017, 2 pages.
Foreign Communication From a Counterpart Application, Chinese Application No. 201480004212.5, Chinese Office Action dated Jun. 2, 2017, 11 pages.
Meeker, "Internet Trends @ Standford—Bases," Dec. 3, 2012, 88 pages.

\* cited by examiner

CONTEXTUALIZED INFORMATION BUS

CROSS-REFERENCE TO RELATED APPLICATIONS

The present application claims priority to U.S. Provisional Patent Application 61/749,639, filed Jan. 7, 2013 by Guo-Qiang Wang, et. al., and entitled "Method and Apparatus for Contextualized Information BUS", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

An Information Centric Network (ICN) is a type of network architecture that focuses on information delivery. ICNs may also be known as content-aware, content-centric, or data oriented networks. ICNs may shift the Internet Protocol (IP) communication model from a host-to-host model to an information-object-to-object model. The IP host-to-host model may address and identify data by storage location (e.g. host IP address), whereas the information-object-to-object model may employ a non-location based addressing scheme that is content-based. Information objects may be the first class abstraction for entities in an ICN communication model. Some examples of information objects may include content, data streams, services, user entities, and/or devices. In an ICN, information objects may be assigned with non-location based names, which may be used to address the information objects, decoupling the information objects from locations. Routing to and from the information objects may be based on the assigned names. ICN may provision for in-network caching, where any network device or element may serve as a temporary content server, thus may improve performance of content transfer. The decoupling of information objects from location and the name-based routing in ICN may allow mobility to be handled efficiently. ICN may also provision for security by appending security credentials to data content instead of securing the communication channel that transports the data content.

SUMMARY

In one embodiment, the disclosure includes a network element (NE), such as a network device or a user device, comprising a plurality of physical interfaces configured to communicate to a plurality of remote NEs in an ICN, a receiver coupled to the plurality of physical interfaces and configured to receive a request for a service from a first of the remote NE via the ICN, wherein the service request comprises a requested service name and a requested service context, a memory comprising a service profile comprising a supported service associating with a supported service name and a supported service context, a processor coupled to the memory and the receiver and configured to generate a service response when the requested service name matches the supported service name and the requested service context matches the supported service context, and a transmitter coupled to the processor and the plurality of physical interfaces and configured to transmit the service response to the first NE via the ICN.

In one embodiment, the disclosure includes a method for interfacing with an ICN protocol layer, wherein the method comprises generating a service request primitive based on a data object name comprising a hierarchical name structure identifying the data object and a data object context comprising a data type attribute, and sending the service request primitive to the ICN protocol layer for delivery to a remote NE in an ICN based on the data object name and the data object context.

In yet another embodiment, the disclosure includes an NE comprising a plurality of interfaces configured to couple to an ICN, wherein each interface employs a different transmission mechanism, a memory comprising a mapping of a data object identifier to a plurality of data type attributes, and a processor coupled to the memory and configured to compute a delivery metric for each interface based on the data type attributes, and select a first interface based on the delivery metric, and a transmitter coupled to the first interface and configured to transmit a first data object associated with the identifier.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
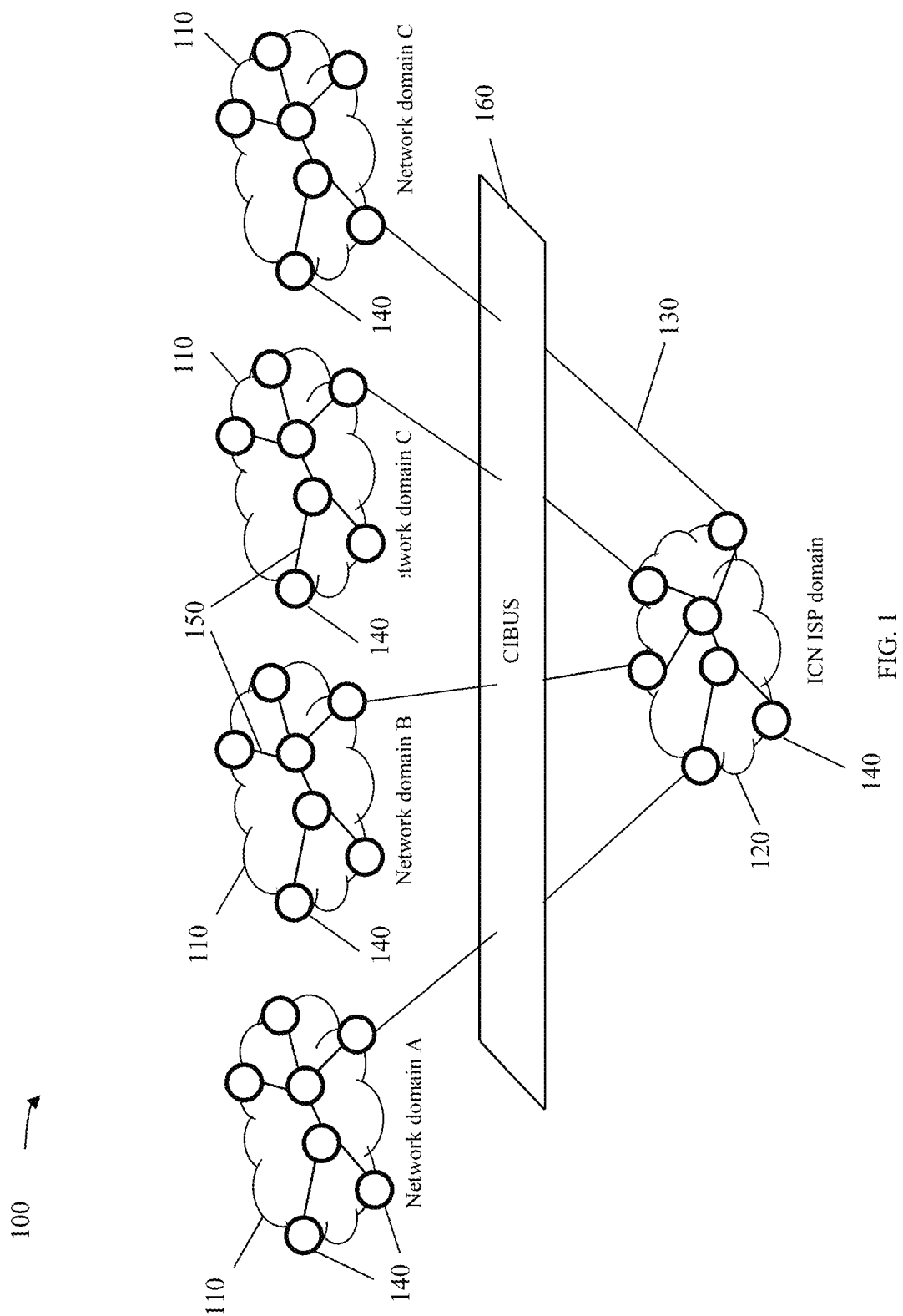
FIG. 1 is a schematic diagram of an embodiment of a contextualized ICN.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The Internet may have evolved from a host centric system to a large content distribution system. Internet traffic may be dominated by content delivery as information-intensive applications continue to grow (e.g. travel, banking, financial services, entertainment, etc.), both to stationary host devices and increasingly to mobile devices. The evolution of the Internet may have become more complex than the original design was provisioned for. As a result, various protocols and/or mechanisms may have been introduced to the IP layer to address the changing needs. For example, the IP security protocol (IPsec) may be added to secure a communication channel between a pair of hosts. However, the add-on protocols and/or mechanisms may be complex and may not be integrated seamlessly. Another evolution may have been the advances in wireline and/or wireless transmission technologies enabling a single communication device to communicate via multiple network interfaces employing different transmission technologies, such as mobile wireless (e.g. Long Term Evolution (LTE)), Institute of Electrical and Electronics Engineers (IEEE) 802.11 wireless local area network (WiFi), and/or any other radio technologies. However, due to the Internet communication model requiring an application to bind to a communication or radio port (e.g. Transmission Control Protocol (TCP) port and/or IP address), applications may not directly take advantage of the multiple available transmission links for concurrent transmission.

ICN is a networking paradigm that may shift the IP host-to-host communication model to a content-to-user communication model, which may focus on delivering desired content to intended users. An ICN may be characterized by some components, such as content-centric request-reply model for data distribution, name-based routing, and in-network caching. The content-centric request-reply model may operate on two primitives, an interest and a data (e.g. an interest packet may pull a data packet). In name-based routing, each data may be assigned with a unique name (e.g. an identifier comprising a hierarchical structured name) and routing of related information may be performed based on such name, rather than by the location of the data (e.g. host address). The in-network caching may be designed inherently into ICN, where an ICN node may comprise a content store (CS), a pending interest table (PIT), and a forwarding information base (FIB). For example, when an in interest packet arrives at an ICN router, if the requested data is cached in the CS, the data may be returned directly from the ICN router. If the requested data is not in the CS, the router may record the content name and the arrival interface in the PIT, and then forward the interest packet via an interface identified by a name look-up in the FIB. As such, ICN may inherently support caching, multicast distribution, forwarding, and routing. In addition, ICN may integrate security seamlessly by embedding security information into the content, rather than securing the communication channel that transports the content.

Disclosed herein is a CIBUS that may be positioned in ICN-enabled devices and may provide mechanisms for information entities (e.g. devices, applications services, consumers, producers, data objects, etc.) in an ICN to communicate with each other based on names and contexts of services and/or contents. For example, a CIBUS may connect consumers to producers and/or applications to services based on the service names (e.g. hierarchical named structures) and the service contexts (e.g. service contents embedded in the hierarchical named structures or explicit attribute lists). Service may refer to a standalone unit of functionality and/or contents that may be consumed by an application via a formally defined interface. A CIBUS may be positioned in an ICN-enabled device by way of implementing a CIBUS framework and/or employing a CIBUS protocol. A CIBUS may provide a flatter networking architecture compared to the commonly used TCP/IP networking model or the Open System Interconnection (OSI) model. A CIBUS may be a middle layer that interfaces an application layer (e.g. OSI layer 7) to a media access control (MAC) layer (e.g. OSI layer 2) and/or a physical (PHY) layer (e.g. OSI Layer 1). A CIBUS may comprise a CIBUS service layer, an ICN protocol layer, and a contextualized-MAC (C-MAC) adaptation layer. A CIBUS may leverage ICN named-based networking architecture. For example, each data may be identified by a data name and a data context, which may comprise a contextualized data type attribute, such as social, location, and/or any other defined semantic. As such, a CIBUS may perform context-aware routing, in-network caching, mobility, security, and/or multicast distribution. In one embodiment, a CIBUS service layer may provide contextualized services, such as service discovery, connection, and/or delivery, name resolution, security and mobility management, and/or self-clustering. The CIBUS service layer may support services in infrastructure (e.g. via a central access point) and/or ad hoc (e.g. directly between devices) communication mode. In another embodiment, the C-MAC adaptation layer may provide contextualized interface selections. In yet another embodiment, a set of interfaces may be defined between each layer to provide a common interface for interactions, thus providing flexibility to support native CIBUS and/or third-party applications and/or services and seamlessly integrate with any MAC and/or ICN protocols.

FIG. 1 is a schematic diagram of an embodiment of a contextualized ICN 100. ICN 100 may comprise a plurality of network domains A, B, C, and D 110 connecting to an ICN-Internet Service Provider (ICN-ISP) domain 120 via connections 130. The network domains A, B, C, D 110, and ICN-ISP domain 120 may comprise ICN-enabled network nodes 140 interconnected via connections 150 and configured to produce, consume, and/or relay data based on names and contexts. Connections 130 and 150 may include physical and/or logical connections, such as fiber optic links, wireless links, and/or electrical links. Connections 130 and 150 may comprise a single link, a series of parallel links, a plurality of interconnected nodes, and/or various combinations thereof used to transport data between network domains A, B, C, D 110 and ICN-ISP domain 120 and/or between network nodes 140. ICN 100 may employ a CIBUS 160 at a protocol level to connect network domains A, B, C, D 110, and ICN-ISP domain 120 via connections 130 and/or 150.

The network domains A, B, C, and D 110 may be networks that are grouped by context, which may include social, personal, location, entertainment, and/or any other defined communities. In an embodiment, network domain A 110 may be a vehicular network and network nodes 140 may be vehicles equipped with communication devices. An ad hoc network (e.g. infrastructure-less) may be formed among the network nodes 140 for vehicular-to-vehicular (V2V) communication and/or connect the network nodes 140 to the ICN-ISP domain 120 for vehicular-to-infrastructure (V2I) communication. For example, V2V communication may allow dynamic exchange of data between nearby vehicles over some wireless links and V2I communication may allow vehicles to dynamically exchange data over ICN-ISP domain 120 with a central server (e.g. city highway management system). Some examples of informational context in a vehicular network may include positions, speeds, and/or locations. The design constraints for data exchange in a vehicular network may include high speed mobility and low delays.

In some embodiments, network domain B 110 may be a sensor network and network nodes 140 may be sensor nodes configured to monitor and/or record some selected conditions for a pre-defined area. The network nodes 140 in a sensor network may communicate with each other and/or a central server over the ICN-ISP domain 120. Some examples of informational context in a sensor network may include temperatures, humidity, power line voltages, and/or any other conditional measurements. Some of the design constraints for data exchange in a sensor network may include low power consumption, low bit rate, small packet size, and diverse radio technologies.

In some embodiments, network domain C 110 may be an enterprise and/or home network and network nodes 140 may include personal computers, mobile devices, routers, switches, climate monitoring devices, security devices, sensors, appliances, etc. An enterprise and/or home network may exchange a diverse set of data, where informational context may be dependent on the applications and/or services and related policies. Some of the design constraints for data exchange in an enterprise and/or home network may include application diversity, which may require different quality of service (QoS) and/or reliability.

In some embodiments, network domain D 110 may be a service network and network nodes 140 may be service providers configured to provide services (e.g. health services, city monitoring services, third party services, etc.). As shown in the above discussions, each network domain A, B, C, or D 110 may be context oriented and may comprise different design constraints for data exchange and network resource utilization. As such, a context-aware communication protocol may be employed to connect producers to consumers and/or applications to services and may consider delivery constraints according to some contexts.

CIBUS 160 may be viewed as a virtual bus at a protocol level that leverages ICN naming flexibility and connects producers to consumers and/or applications to services among network domains A, B, C, D 110, and/or through ICN-ISP domain 120 based on the contexts of the exchanged information. A CIBUS 160 may be implemented as a software framework and/or employed as a protocol in any network nodes 140 in ICN 100. CIBUS 160 may support contextualized service management by providing service discovery, publish, and/or delivery, as well as name resolution, mobility, security, and/or self-clustering. CIBUS 160 may be employed in an ad hoc network environment and/or an infrastructure network. For example, in an ad hoc network, CIBUS 160 may discover services in an infrastructure-less manner resulting in exchange of contextual interests and data between dynamically connected devices, whereas in an infrastructure network, CIBUS 160 may discover services via some central authorities and/or exchange data between devices and servers in ICN 100.

Figure 2:
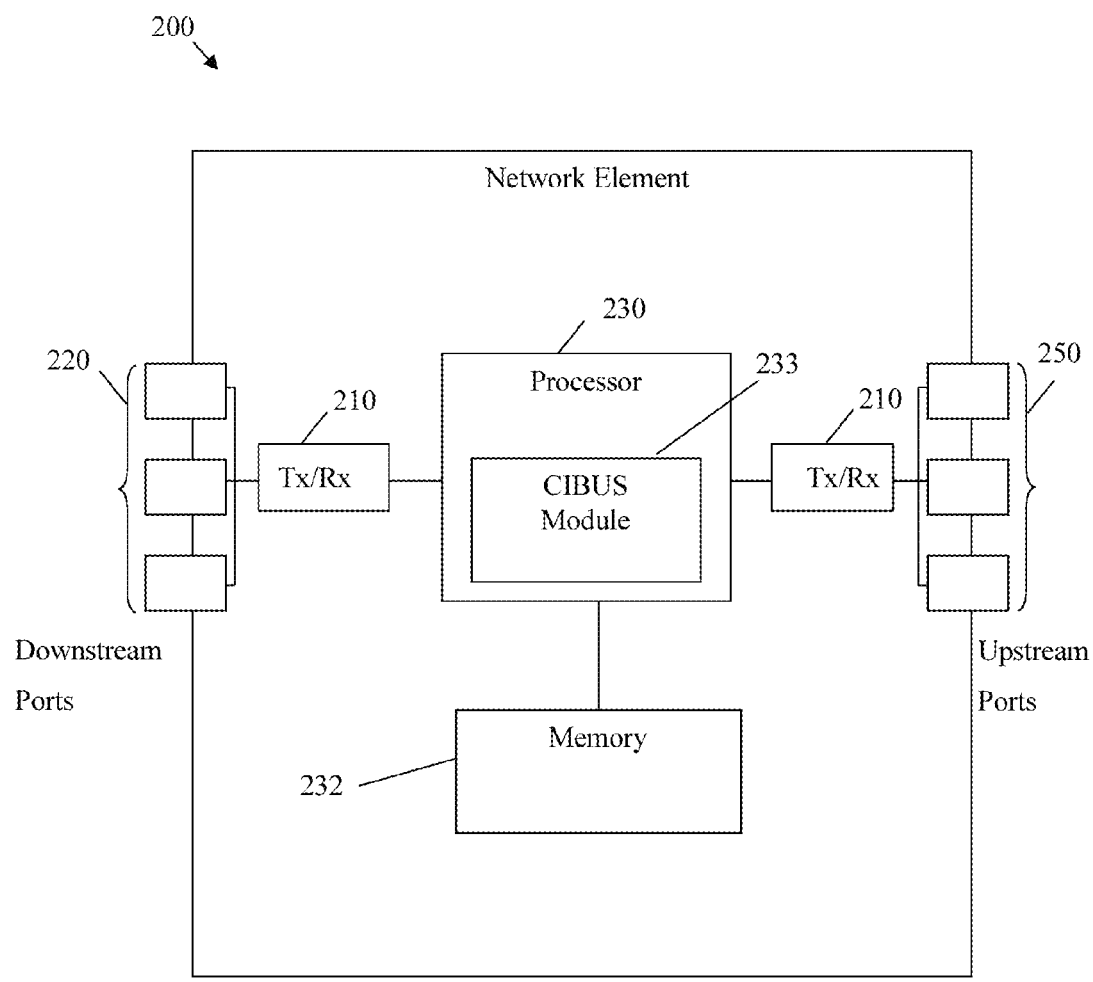
FIG. 2 is a schematic diagram of an embodiment of an NE, which may act as a node in an ICN.

FIG. 2 is a schematic diagram of an example embodiment of an NE 200, which may be any device that transports and processes data through a contextualized ICN (e.g. ICN 100). For instance, the NE 200 may be an ICN-enabled router, switch, and/or any network nodes in a contextualized ICN. NE 200 may be configured to implement and/or support the CIBUS mechanism described herein. NE 200 may be implemented in a single node or the functionality of NE 200 may be implemented in a plurality of nodes. One skilled in the art will recognize that the term NE encompasses a broad range of devices of which NE 200 is merely an example. NE 200 is included for purposes of clarity of discussion, but is in no way meant to limit the application of the present disclosure to a particular NE embodiment or class of NE embodiments.

At least some of the features/methods described in the disclosure may be implemented in a network apparatus or component such as an NE 200. For instance, the features/methods in the disclosure may be implemented using hardware, firmware, and/or software installed to run on hardware. As shown in FIG. 2, the NE 200 may comprise transceivers (Tx/Rx) 210, which may be transmitters, receivers, or combinations thereof. A Tx/Rx 210 may be coupled to plurality of downstream ports 220 for transmitting and/or receiving frames from other nodes and a Tx/Rx 210 may be coupled to plurality of upstream ports 250 for transmitting and/or receiving frames from other nodes, respectively. A processor 230 may be coupled to the Tx/Rx 210 to process the frames and/or determine which nodes to send the frames to. The processor 230 may comprise one or more multi-core processors and/or memory devices 232, which may function as data stores, buffers, etc. Processor 230 may be implemented as a general processor or may be part of one or more application specific integrated circuits (ASICs) and/or digital signal processors (DSPs). Processor 230 may comprise a CIBUS module 233, which may implement a bootstrapping method 500, an application execution method 600, a mobility management method 700, and/or an interface selection method 800 as discussed more fully below. In an alternative embodiment, the CIBUS module 233 may be implemented as instructions stored in the memory devices 232, which may be executed by processor 230. The memory device 232 may comprise a cache for temporarily storing content, e.g., a Random Access Memory (RAM). Additionally, the memory device 232 may comprise a long-term storage for storing content relatively longer, e.g., a Read Only Memory (ROM). For instance, the cache and the long-term storage may include dynamic random access memories (DRAMs), solid-state drives (SSDs), hard disks, or combinations thereof.

It is understood that by programming and/or loading executable instructions onto the NE 200, at least one of the processor 230 and/or memory device 232 are changed, transforming the NE 200 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 3:
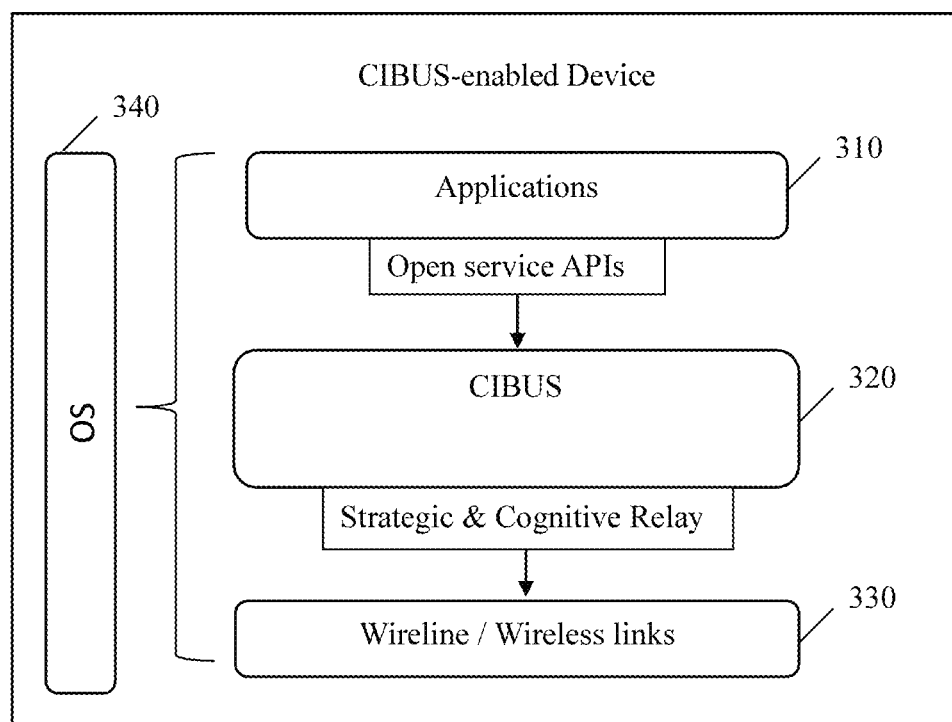
FIG. 3 is a schematic diagram of an embodiment of an architectural view of a CIBUS-enabled device.

FIG. 3 is a schematic diagram of an embodiment of an architectural view of a CIBUS-enabled device 300. Device 300 may be any ICN-enabled device, such as an ICN-enabled router, an ICN-enabled user device, and/or an ICN-enabled server. Device 300 may comprise a networking architecture comprising an application layer 310, a CIBUS protocol layer 320, and a transmission layer 330. Application layer 310 may comprise a plurality of applications (e.g. emails, service booking, banking, etc.) that may produce and/or consume data. CIBUS protocol layer 320 may comprise a plurality of service and/or networking components configured to provide context-aware service management, named-based routing and/or forwarding, in-network storage, name resolution, self-discovery, and/or self-organization. In addition, the CIBUS protocol layer 320 may be suitable for communication in an infrastructure mode and/or an ad hoc mode. The transmission layer 330 may comprise one or more wireless (e.g. WiFi, LTE, etc.) and/or wireline (e.g. fiber optics, cables, powerline, etc.) transmitter-receivers configured to transmit and receive data via an ICN. Operating System (OS) 340 may comprise one or more resource management components (e.g. task manager memory manager, Input/Output (I/O) manager) configured to control and/or manage system resources, such as information, applications, device specifics, user locations, storage, computing power, topology, and/or bandwidth, in device 300. In the networking architecture of device 300, the CIBUS protocol layer 320 may be a middleware that interfaces the application layer 310 to the transmission layer 330. The CIBUS protocol layer 320 may translate data from an application format to an ICN format (e.g. interest and/or data) and/or in the reverse direction. The CIBUS protocol layer 320 may interact with the application layer 310 via some defined open service Application Programming Interfaces (APIs) for content publish, delivery, and/or services and may transmit and/or receive data to and/or from a contextualized-ICN (e.g. ICN 100) via transmission layer 330 by employing some strategic and intelligent interface to select an appropriate transmission link for transmission.

Figure 4:
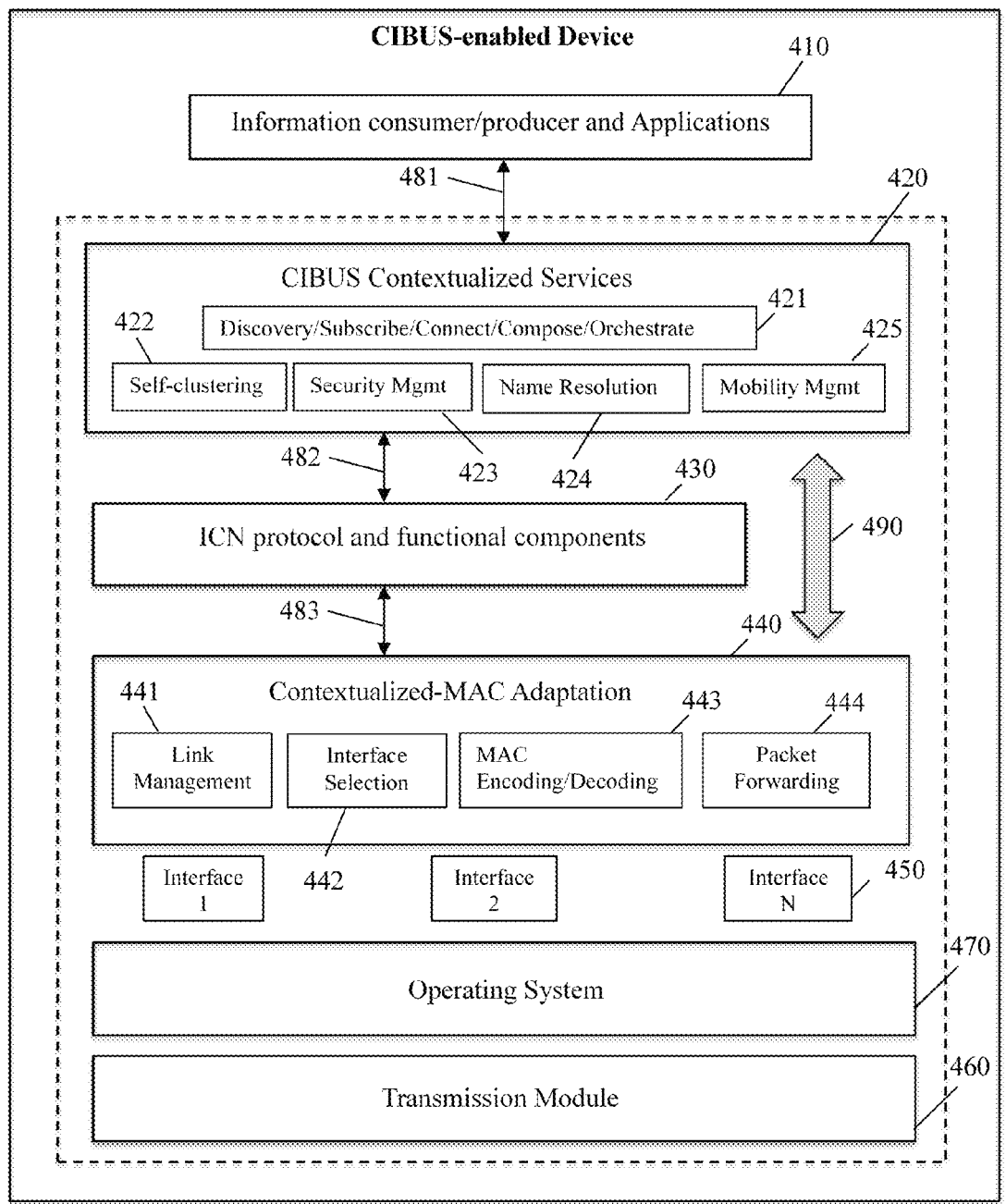
FIG. 4 is a schematic diagram of an embodiment of a functional view of a CIBUS-enabled device.

FIG. 4 is a schematic diagram of an embodiment of a functional view of a CIBUS-enabled device 400. The functional components in device 400 may comprise an application module 410, a CIBUS service module 420, an ICN module 430, a C-MAC adaptation module 440, a plurality of interfaces 450, a transmission module 460, and an OS 470. OS 470 may be any OS (e.g. Linus, Android, sensor OS) configured to manage resources, such as information, applications, device specifics, user locations, storage, computing power, topology, and/or bandwidth, in device 400.

Application module 410 may comprise a plurality of applications, which may publish content, fetch content, and/or provide services (e.g. emails, voice over IP, banking, etc.) by interfacing to CIBUS service module 420 via a CIBUS socket interface 481, which may employ a set of CIBUS socket APIs.

CIBUS service module 420 may comprise a contextualized service management sub-module 421, a self-clustering sub-module 422, a security management sub-module 423, a name resolution sub-module 424, and a mobility management sub-module 425. The contextualized service management sub-module 421 may perform service discovery, subscription, connection, composition, and/or orchestration based on a name and a context. For example, service discovery may include looking up a service identifier (ID) and a service locator (e.g. from a service directory in an ICN domain and/or direct message exchanges between CIBUS enabled devices) based on a name and a context in a service discovery request. Service subscription may include registering with the service producer (e.g. to be a member of a service) based on some scoping and/or security information for a service and/or subsequently receiving data when the service producer publishes data. Service connection may include establishing a connection to a service based on a name and a context in a service request and may be performed according to some scoping information and/or policies. A service (e.g. parent service) may be composed of a plurality of services (e.g. child services), where a consumer may only be required to request for the parent service without having knowledge of the child services. Thus, service composition may include aggregating a plurality of services by contexts and representing the plurality of services as a single service to a consumer and service orchestration may include decomposing a service request by contexts into a plurality of service requests. For example, the service management sub-module 421 may decompose an application request for a movie in a specific language (e.g. service-request{/service/movie-content-provider-x/movie-title-1; context: {language-y}}) into three service requests: a video request (e.g. service-request{/service/movie-content-provider-x/video/movie-title-1}), an audio request (e.g. service-request{/service/movie-content-provider-x/audio/movie-title-1}), and a language translation request (e.g. service-request {/service/movie-content-provider-x/translate}). It should be noted that service discovery may also be performed by employing service discovery schemes disclosed in U.S. patent application Ser. No. 13/658,299 filed Oct. 23, 2012 by Xinwen Zhang, et al. and entitled, "Name-Based Neighbor Discovery and Multi-Hop Service Discovery in Information-Centric Networks", which is incorporated herein by reference as if reproduced in its entirety.

The self-clustering sub-module 422 may form, manage, and facilitate an ad hoc network (e.g. infrastructure-less network) among a group of CIBUS-enabled devices (e.g. CIBUS-enabled device 300, 400, and/or network nodes 140) sharing a same service (e.g. private chat service) with a same context (e.g. social group ID, security attributes, ad hoc communication mode). The security management sub-module 423 may perform name and contextual-based security management, such as providing access to a network through an authentication process and/or authorize content based on a context (e.g. a pre-stored or pre-established security profile). The name resolution sub-module 424 may resolve a data identifier (e.g. a name and a context) to a set of locators (e.g. storing a copy of the data). The mobility management sub-module 425 may perform name and contextual-based mobility management, such as tracking and updating locator information and/or switching access points (e.g. handover) based on a name and a context. The CIBUS service module 420 may interface with the ICN protocol module 430 via a CIBUS-ICN interface 482, which may employ a set of service primitives. In addition, the CIBUS service module 420 may perform management functions by supervising the C-MAC adaptation module 440 via a CIBUS-CMAC management interface 490, which may employ a set of C-MAC APIs. It should be noted that each of the operations performed at the CIBUS service module 420 may invoke one or more services and may be translated into one or more ICN interest-data transactions ICN module 430 may comprise a routing and forwarding sub-module, a CS, a FIB, and/or a PIT and may implement the ICN protocol, which may support data caching via the CS, routing and forwarding by tracking and/or updating FIB and/or PIT, and/or security integration by directly appending security signatures in data content. The ICN protocol module 430 may interface with the C-MAC adaptation module 440 via a C-MAC interface 483, which may employ a substantially similar set of C-MAC APIs as the CIBUS-CMAC management interface 490.

The C-MAC adaption module 440 may comprise a link management sub-module 441, an interface selection sub-module 442, a MAC encoding/decoding sub-module 443, and a packet forwarding sub-module 444. The link management sub-module 441 may collect, monitor, and/or report link measurements for each interface 450, where link measurements may include physical link quality (e.g. signal-to-noise ratio (SNR), receive signal strength indicator (RSSI), bit error rate (BER), etc.), as well as network performance measurements (e.g. delays, retransmission ratios, delivery statistics, etc.), and/or an aggregated physical link and network performance measurements for each of the interfaces 450. The interface selection sub-module 442 may select one or more of the interfaces 450 for communication according to a context based on some computed delivery metric. The MAC encoding/decoding sub-module 443 may encode outgoing data packets received from the ICN module 430 according a MAC protocol employed for the selected interface. Similarly, the MAC encoding/decoding sub-module 443 may decode incoming data packets received from one of the interfaces 450 according to a corresponding MAC protocol. The packet forwarding sub-module 444 may forward data between the interfaces 450 and ICN module 430 and may further optimize content delivery by employing some strategic algorithms, which may include forwarding strategies disclosed in U.S. patent application Ser. No. 13/672,924 filed Nov. 9, 2012 by Haiyang Qian, et al. and entitled, "Method and Apparatus for Adaptive Forwarding Strategies in Content-Centric Networking", which is incorporated herein by reference as if reproduced in its entirety. It should be noted that the ICN protocol module 430 may select an interface by looking up a FIB for a next hop, whereas the C-MAC adaptation module 440 may incorporate more complex and advanced schemes with additional context information, measurements, and/or initiating interface probing. It should be noted that in an ad hoc networking environment, the interface selection sub-module 442 may determine to transmit a packet (e.g. a service discovery request) via all of the interfaces 450 and/or to forward a received packet to all of the interfaces 450 except the receiving interface of the received packet.

The transmission module 460 may comprise a plurality of transmitters and/or receivers, which may be wireless and/or wireline. For example, the transmission module 460 may implement a LTE transmitter-receiver and a WiFi transmitter-receiver. In one embodiment, the transmission module 460 may support physical layer only. In an alternative embodiment, transmission module 460 may support both the MAC and physical layers. In such an embodiment, the C-MAC adaptation module 440 may be a thin layer that controls and/or manages the interface selection and the transmission module 460 may support MAC protocol specifics (e.g. MAC data packet processing).

Figure 5:
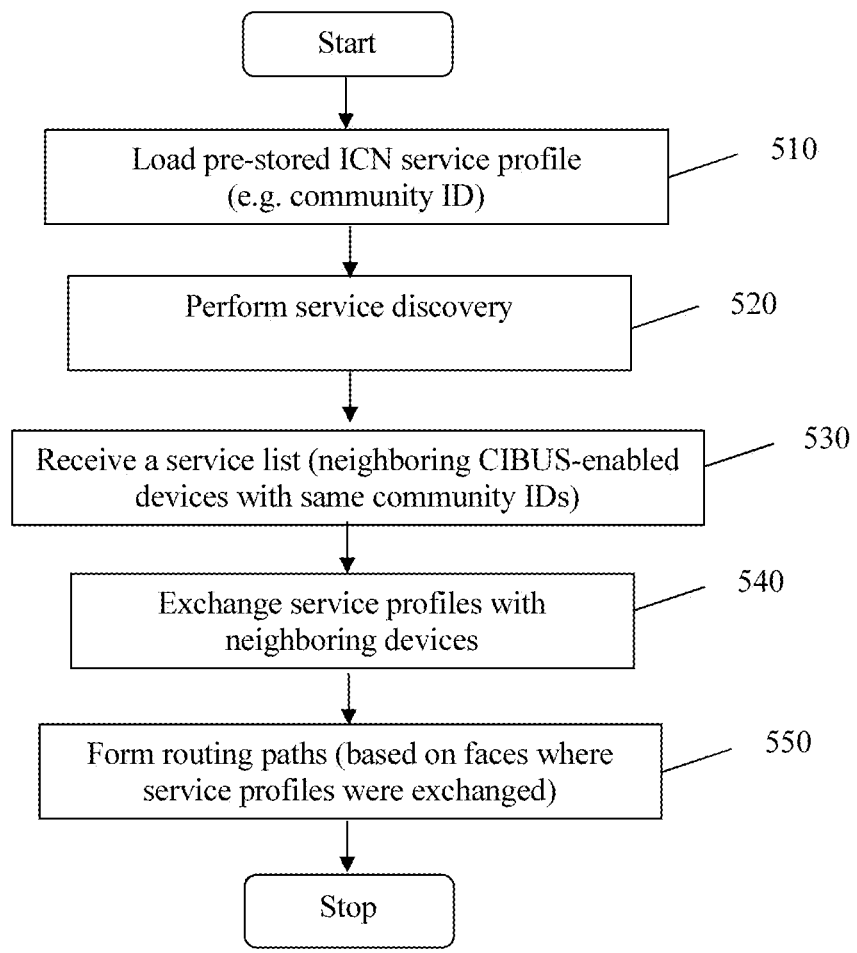
FIG. 5 is a flowchart of an embodiment of a method for bootstrapping a CIBUS-enabled device.

FIG. 5 is a flowchart of an embodiment of a method 500 for bootstrapping a CIBUS-enabled device, which may be implemented on a CIBUS-enabled device, such as network node 140, CIBUS-enabled device 300, CIBUS-enabled device 400, and/or NE 200. Method 500 may start when the CIBUS-enabled device is powered on. At step 510, method 500 may load a pre-stored ICN service profile, which may comprise a named service with a context (e.g. a community ID) supported by the CIBUS-enabled device. At step 520, method 500 may perform service discovery to search for CIBUS-enabled devices comprising the same community ID. For example, the service discovery may be initiated by a service discovery application and may be performed via a CIBUS (e.g. CIBUS 160, CIBUS service module 420). At step 530, method 500 may receive a service list comprising CIBUS-enabled devices with the same community ID. At step 540, method 500 may exchange service profiles with the CIBUS-enabled devices in the service list. At step 550, method 500 may form routing paths based on the discovered service name and the interfaces in which the service was exchanged. The routing paths may be stored in a FIB according to the ICN protocol.

Method 500 may be suitable for communication in both infrastructure and ad hoc modes. For example, in an infrastructure communication mode, services may be discovered via a central service management entity while in an ad hoc communication mode, services may be discovered by sending a service discovery request by flooding all interfaces and exchanging service profiles (e.g. contextual information) directly between other dynamically connected CIBUS devices. In the case of an ad hoc mode communication, upon the completion of bootstrapping, the CIBUS-enabled device may build a self-organized network (e.g. social clustering) with neighboring CIBUS-enabled devices (e.g. obtained from the exchanged service profiles) sharing services with the same context. For example, a group of CIBUS-enabled devices sharing the same context may form an ad hoc network (e.g. private chat group) without a formal central network management entity and the group of CIBUS-enabled devices may exchange messages between each other to perform network management and/or control functions (e.g. user/device/service discovery, security, mobility, and/or configuration management). In some embodiments, one of the CIBUS-enabled devices may act as a temporary gateway for the group of CIBUS-enabled devices. In addition, the CIBUS-enabled device may execute applications based on the service profiles exchanged during service discovery. For example, the CIBUS-enabled device may subscribe to services received from the exchanged service profiles.

Figure 6:
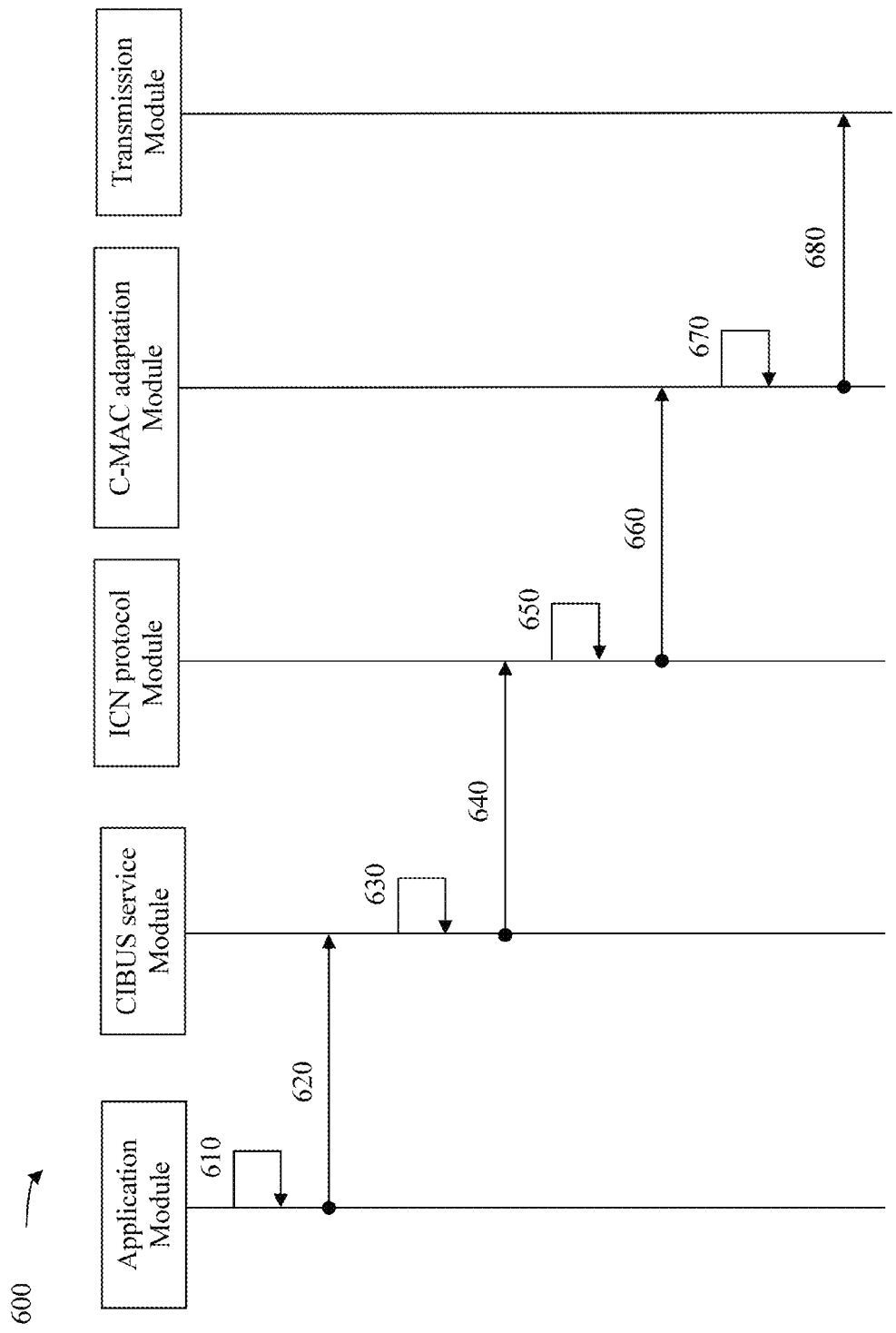
FIG. 6 is a protocol diagram of an embodiment of a method for executing an application via a CIBUS protocol.

FIG. 6 is a protocol diagram of an embodiment of a method 600 for executing an application via a CIBUS protocol, which may be implemented on a CIBUS-enabled device, such as network node 140, CIBUS-enabled device 300, CIBUS-enabled device 400, and/or NE 200. Method 600 may illustrate the operational flow when an application is executed on the CIBUS-enabled device, which may be initiated by an application module (e.g. application module 410) and may invoke processing at a CIBUS service module (e.g. CIBUS service module 420), an ICN protocol module (e.g. ICN protocol module 430), a C-MAC adaptation module (e.g. C-MAC adaptation module 440), and a transmission module (e.g. transmission module 460), as well as interactions between the modules. Method 600 may begin at step 610, where an application may generate a request to fetch a data object. The application request may include a name (e.g. content ID or service ID), contexts (e.g. location, personal, etc.), and some metadata (e.g. content scope and/or security). At step 620, the application may send the request to a CIBUS service module via a CIBUS socket API. At step 630, upon the reception of the application request at the CIBUS service module, the CIBUS service module may process the application request and generate one or more service primitives as discussed more fully below. At step 640, the CIBUS service module may send the service primitives to an ICN protocol module.

At step 650, upon the reception of the service primitives at the ICN protocol module, the ICN protocol module may generate one or more interest packets according to the ICN protocol (e.g. to show interest in and/or request associated data from the ICN) and/or execute any other required process (e.g. global resolution and/or local resolution) according to the received service primitives and/or some other pre-defined rules. In addition, the ICN protocol module may select an interface to forward the interest packets by FIB look up and/or employ some selection algorithm based on link events provided by a C-MAC adaptation module. It should be noted that the ICN protocol module may register with the C-MAC adaptation module for one or more link events (e.g. transmission links related) of interest and the C-MAC adaptation module may notify the ICN protocol module when any one of the registered link events occur. The ICN protocol module may also register for a new link event and/or delete a previously registered link event. At step 660, the ICN protocol module may send a request to the C-MAC adaptation module to forward the interest packets. At step 670, the C-MAC adaptation module may further refine the interface choice based on the context and/or real-time content delivery metrics (e.g. delivery statistics, link quality, etc.). In addition, the C-MAC adaptation module may encode the interest packets according to the selected interface and/or any additional processing required by the selected interface. At step 680, the C-MAC adaptation module may forward the interest packets to a transmission module for transmission via an ICN (e.g. ICN 100). It should be noted that MAC encoding in step 670 may or may not be required depending on the partition of the MAC operations. For example, MAC encoding may not be required when the C-MAC adaptation module is a thin layer, where MAC specifics may be supported in the transmission module.

Figure 7:
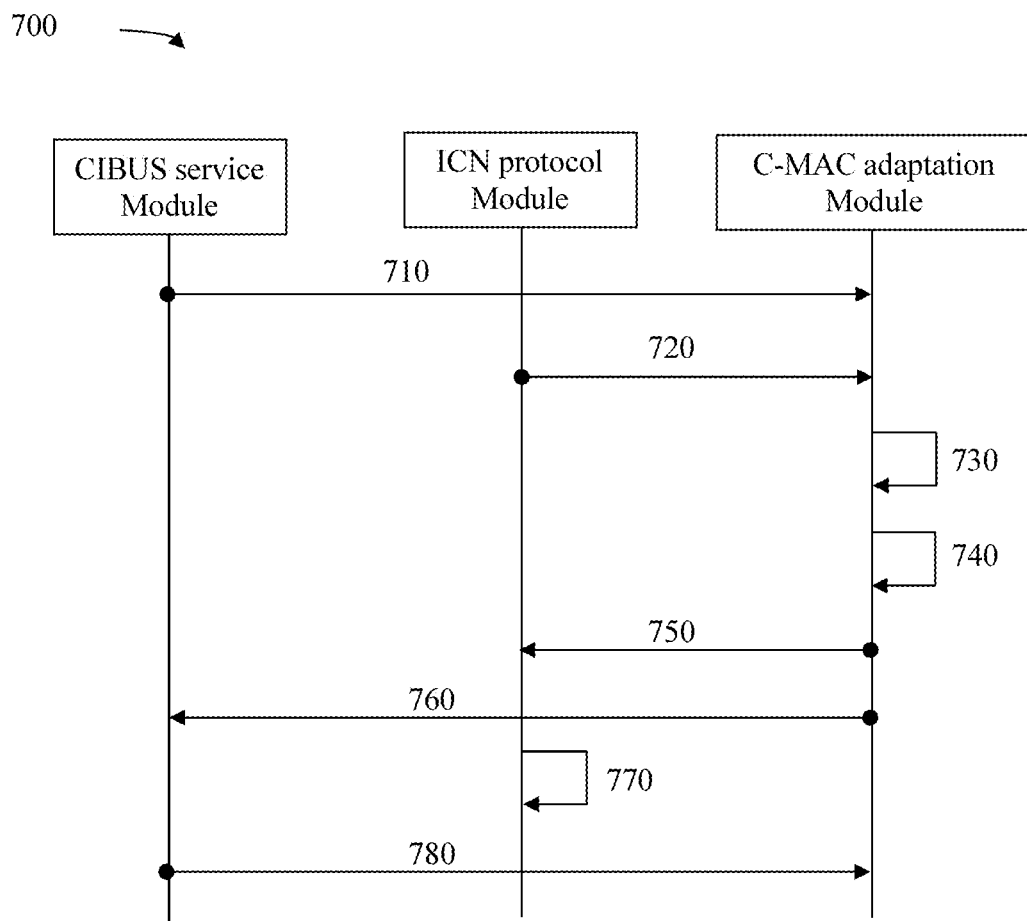
FIG. 7 is a protocol diagram of an embodiment of a method for managing mobility in a CIBUS-enabled device.

FIG. 7 is a protocol diagram of an embodiment of a method 700 for managing mobility in a CIBUS-enabled device, such as network node 140, CIBUS-enabled device 300, CIBUS-enabled device 400, and/or NE 200. Method 700 may illustrate the interactions between a CIBUS service module (e.g. CIBUS service module 420), an ICN protocol module (e.g. ICN protocol module 430), and a C-MAC adaptation module (e.g. C-MAC adaptation module 440) for mobility management. Method 700 may begin at step 710, where a CIBUS service module may register for a link-state update event with a C-MAC adaptation module. The link-state event may be specified for a selected set of interfaces and may comprise a context (e.g. signal quality, throughput, or global positioning system (GPS) location). At step 720, an ICN protocol module may also register for the link-state update event with the C-MAC adaptation module. It should be noted that the ICN protocol module may initiate the link-state update event registration based on some pre-configured event monitoring profile stored in the CIBUS-enabled device. Alternatively, the CIBUS service module may instruct the ICN protocol module to register for the link-state update event. At step 730, the C-MAC adaptation module may set up some detection thresholds for triggering the link-state update event. At step 740, the C-MAC adaptation module may detect a radio link interface status change (e.g. meeting the threshold). Upon the detection of the status change, the C-MAC adaptation module may send the link-state update event to the ICN protocol module at step 750 and to the CIBUS service module at step 760. At step 770, upon the reception of the event at the ICN protocol module, the ICN protocol module may label the interfaces stored in a FIB with the received status. At step 780, upon the reception of the event at the CIBUS service module, the CIBUS service module may trigger a mobility action (e.g. switching access point). It should be noted that the CIBUS service module may also supervise the ICN protocol module to update the FIB forwarding ratio on some selected interfaces.

Figure 8:
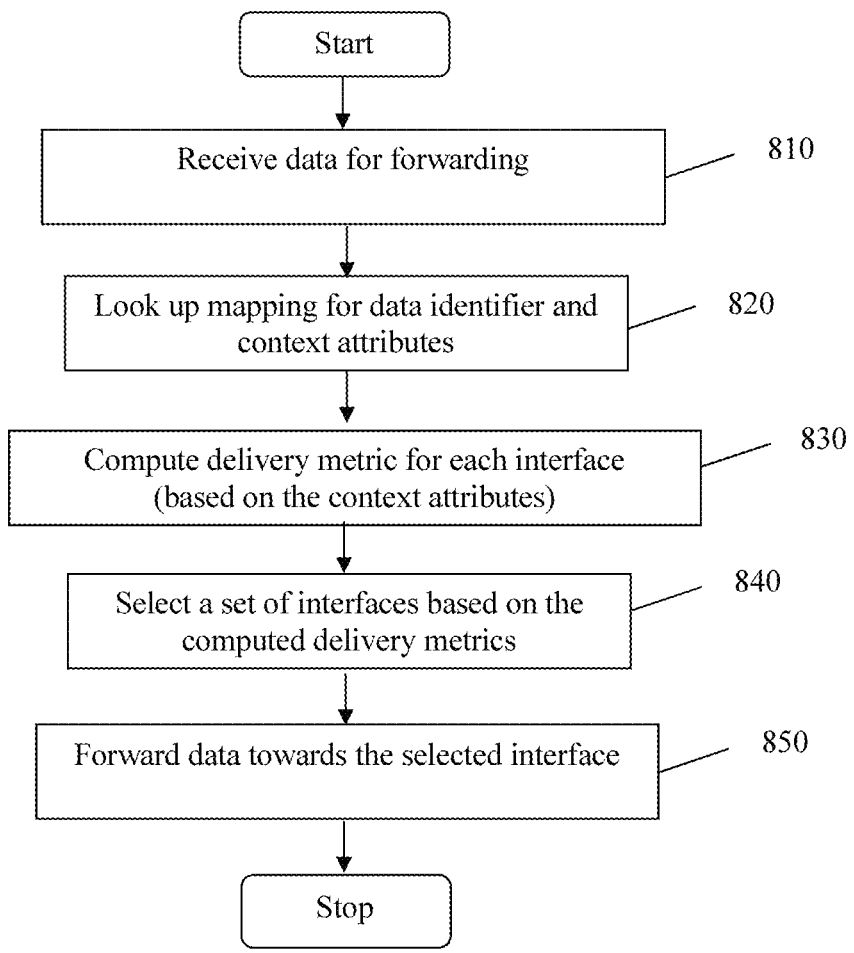
FIG. 8 is a flowchart of an embodiment of a method 800 for interface selection via a CIBUS protocol.

FIG. 8 is a flowchart of an embodiment of a method 800 for interface selection via a CIBUS protocol, which may be implemented on a CIBUS-enabled device, such as network node 140, CIBUS-enabled device 300, CIBUS-enabled device 400, and/or NE 200. Method 800 may begin with receiving a data at a C-MAC adaptation module (e.g. C-MAC adaptation module 440) for forwarding at step 810. At step 820, method 800 may look up a mapping between the data identifier and the context attribute of the data. At step 830, method 800 may compute a delivery metric for each interface in the CIBUS-enabled device in terms of the context attributes. At step 840, method 800 may select a set of interfaces based on the computed delivery metrics. At step 850, method 800 may forward the data towards the selected interface. It should be noted that method 800 may also encode the data according to the MAC protocol of the selected set of interfaces prior to forwarding to the interfaces when the C-MAC adaptation module includes MAC layer processing for all the MAC protocols supported by the interfaces. In addition, method 800 may be repeated within a single application session (e.g. without re-registration or restarting the application) and select a different interface based on updated delivery metrics.

In an embodiment, the CIBUS protocol may provide well defined interfaces at each layer (e.g. service layer, ICN protocol layer, C-MAC adaptation layer) to provide a common interaction mechanism, thus providing flexibility to support native CIBUS and/or third parties applications and/or services and may seamlessly integrate with MAC and/or ICN protocol implementations. The interfaces may include CIBUS socket APIs (e.g. at CIBUS socket interface 481), service primitives (e.g. at CIBUS-ICN interface 482), and C-MAC APIs (e.g. at C-MAC interface 483 and/or CIBUS-CMAC management 490), which may be described in the next three embodiments. It should be noted that the APIs and/or primitives may be described in the form of an operation and a parameter list and may be implemented via function calls, message exchanges (e.g. type-length-value (TLV) encoded messages), and or any other mechanism and/or format. In addition, the interfaces may be across different subsystems and may or may not apply security.

In a first embodiment, a CIBUS service module (e.g. CIBUS service module 420) may provide a set of standardized CIBUS socket APIs for an application module (e.g. application module 410) to publish content, fetch content, and/or request for a service via the CIBUS. The set of CIBUS socket APIs may include a put API for content publish, a get API for content fetch, and a service API for service request. The following table lists the CIBUS socket APIs:

TABLE 1

CIBUS Socket APIs

| CIBUS Socket APIs | Descriptions |
| --- | --- |
| Put (EntityID, {Contexts}, {Metadata}) | Content publish |
| Get (EntityID, {Contexts}, {Metadata}) | Content fetch |
| Service ({Actions}, {EntityIDs}, {Contexts}, {Metadata}) | Service request |

The CIBUS socket Put API may be employed to publish a data object to a remote node in an ICN. For example, the CIBUS service module may translate the put operation into one or more interest and/or data transactions with the remote node. If the put operation is performed on an existing data object, the original data object may be overwritten by the new data object. The following table lists the definitions of the parameters in the Put API:

TABLE 2

Parameters for Put API

| Parameter Name | Definitions |
| --- | --- |
| EntityID | Identifier or name of a data object be published (e.g. application ID, content ID, service ID, user device ID, etc.). |
| Contexts | One or more contexts associated with the data object (e.g. social, location, personal, mobility, etc.). |
| Metadata | Data associated with the data object. |

The CIBUS socket Get API may be employed to fetch a data object from a remote node in an ICN. For example, the CIBUS service module may translate the get operation into one or more interest and/or data transactions with the remote node. The following table lists the definitions of the parameters in the Get API:

TABLE 3

Parameters for Get API

| Parameter Name | Definitions |
| --- | --- |
| Entity ID | Identifier or name of a data object to be fetched (e.g. application ID, content ID, service ID, user device ID, etc.). |
| Contexts | One or more contexts associated with the data object. |
| Metadata | Data associated with the data object. |

The CIBUS socket Service API may be employed to request a service operation, such as discovery, subscribe, connect, compose, orchestrate, etc., in an ICN. For example, the CIBUS module may translate the service operation into one or more interest and/or data for the requested service to one or more remote nodes in the ICN. The following table lists the definitions of the parameters in the Service API:

TABLE 4

Parameters for Service API

| Parameter Name | Definitions |
| --- | --- |
| Actions | One or more actions for a requested services (e.g. discovery, subscribe, connect, compose, orchestrate, etc.). |
| Entity IDs | One or more identifiers or names of the requested services. |
| Contexts | One or more contexts associated with the requested services. |
| Metadata | Data associated with the requested services. |

In a second embodiment, an ICN protocol module (e.g. ICN protocol module 430) may provide a set of standardized service primitives for interfacing with a CIBUS service module (e.g. CIBUS service module 410). The set of service primitives may be defined with operation name, object name, and a parameter list. Operation name may indicate operation type, object name may be the object that the operation is functional on, and the parameter list may indicate some attributes which may be used to enforce the operation policy. Service primitives may perform operations on a fully distinguished name (FDN) or a relative distinguished name (RDN), which may be a full name or a partial name in a hierarchical naming tree, respectively, with scope and filter on the selected objects. Service primitives may include operations, such as request and response for content publish, content fetch, content delete, action request, and event notification. Each service primitive may include a parameter list, in which some parameters may be mandatory and may be indicated as (M) and some parameters may be optional and may be indicated as (O) in the descriptions below.

The Get service primitive may be used to fetch a named object from a remote node in an ICN. The get operation may include an interest and a data response (e.g. interest and data in the ICN protocol). The following lists the request and response for the get operation:

```
Get_req (
        Object_name,    (M)
        Attribute_list, (O)
        Scope,          (O)
        Filter          (O)
        )
Get_rsp
        (
        Object_name,    (M)
        Attribute_list, (O)
        Data,           (M)
        Error_code      (O)
        )
```

The following table lists the definitions of the parameters for the Get service primitive:

TABLE 5

Parameters for Get Service Primitive

| Parameter Name | Definitions |
| --- | --- |
| Object_name | FDN/RDN of named object which performs operation (e.g. content ID). |
| Attribute_list | Array of parameter (attribute_ID, attribute_value) with variable length (e.g. context ID and context attribute). |
| Scope | Specify the sub-tree level of the naming tree for potential objects to be selected. |
| Filter | Boolean expression involving attribute value to be evaluated for all selected objects. |
| Data | Data associated with the name. |
| Error_code | Indicate the reason of error. |

The Put service primitive may be used to publish a named object to a remote node in an ICN. The put operation may include a request to publish a content and a response to confirm the request. If the put operation is performed on an existing named object, the original data may be replaced by the new data. The following lists the request and response for the put operation:

```
Put_req (
        Object_name,    (M)
        Attribute_list, (O)
        Data            (M)
        )
Put_rsp
        (
        Object_name,    (M)
        Attribute_list, (O)
        Error_code,     (O)
        )
```

The following table lists the definitions of the parameters for the Put service primitive:

TABLE 6

Parameters for Put Service Primitive

| Parameter Name | Definitions |
| --- | --- |
| Object_name | FDN/RDN of named object which performs operation (e.g. content ID). |
| Attribute_list | Array of parameter (attribute_ID, attribute_value) with variable length (e.g. context ID and context attribute). |
| Data | Data associated with the name. |
| Error_code | Indicate the reason of error. |

The Delete service primitive may be used to remove a named object from a remote node in an ICN. The delete operation may include a request and a response. The following lists the request and response for the delete operation:

```
Delete_req (
    Object_name,    (M)
    Attribute_list, (O)
    Scope,          (O)
    Filter          (O)
)
Delete_rsp
(
    Object_name,    (M)
    Attribute_list, (O)
    Error_code      (O)
)
```

The following table lists the definitions of the parameters for the Delete service primitive:

TABLE 7

Parameters for Delete Service Primitive

| Parameter Name | Definitions |
| --- | --- |
| Object_name | FDN/RDN of named object which performs operation (e.g. content ID). |
| Attribute_list | Array of parameter (attribute_ID, attribute_value) with variable length (e.g. context ID and context attribute). |
| Scope | Specify the sub-tree level of the naming tree for potentially objects to be selected. |
| Filter | Boolean expression involving attribute value to be evaluated for all selected objects. |
| Error_code | Indicate the reason of error. |

The Action service primitive may be employed to perform an action on a named object. The potential action may include registration to access an ICN, deregistration, user subscription for an event, or issue a mobility control, etc. The action operation may include a request to perform an operation and a response to confirm the request. The following lists the request and response for the action request operation:

```
Action_req (
    Object_name,    (M)
    Attribute_list, (O)
    Action_info     (M)
)
Action_rsp
(
    Object_name,    (M)
    Attribute_list, (O)
    Action_info,    (M)
    Error_code      (O)
)
```

The following table lists the definitions of the parameters for the Action service primitive:

TABLE 8

Parameters for Action Service Primitive

| Parameter Name | Definitions |
| --- | --- |
| Object_name | FDN/RDN of named object which performs operation (e.g. content ID). |
| Attribute_list | Array of parameter (attribute_ID, attribute_value) with variable length (e.g. context ID and context attribute). |
| Action_info | Information in action request and/or response about the action to perform. |
| Error_code | Indicate the reason of error. |

The Event service primitive may be used to notify a pre-subscribed event from an ICN to a user. The Event service primitive may be a one-way message which may not require a confirmation (e.g. best effort delivery). The following lists the event notification:

```
Event_notification (
    Object_name,    (M)
    Attribute_list, (M)
    Event_type,     (M)
    Event_info      (O)
)
```

The following table lists the definitions of the parameters for the Event service primitive:

TABLE 9

Parameters for Event Service Primitive

| Parameter Name | Definitions |
| --- | --- |
| Object_name | FDN/RDN of named object which performs operation (e.g. content ID). |
| Attribute_list | Array of parameter (attribute_ID, attribute_value) with variable length (e.g. context ID and context attribute). |
| Event_type | Specify the type of event that occurs. |
| Event_info | Specify the reported event information. |

In a third embodiment, a C-MAC adaptation module (e.g. C-MAC adaptation module 420) may interface with an ICN protocol module (e.g. ICN protocol module 430) and/or a CIBUS service module (e.g. CIBUS service module 410) through a set of standardized C-MAC APIs. The set of C-MAC APIs may include operations, such as event subscription, event notification, and action request. The following table lists the C-MAC APIs:

TABLE 10

C-MAC APIs

| C-MAC APIs | Descriptions |
| --- | --- |
| Subscribe ({Contexts}, {Events}) | Event subscription to C-MAC |

TABLE 10-continued

C-MAC APIs

| C-MAC APIs | Descriptions |
| --- | --- |
| Event ({Contexts}, {EventTypes}, {States}) | Event notification from C-MAC |
| Action ({Contexts}, {Operations}, {Metadata}) | Action request to C-MAC |

The C-MAC Subscribe API may be employed to subscribe to a C-MAC event (e.g. a link event), for example, from an ICN protocol module or a CIBUS service module. The following table lists the definitions of the parameters in the Subscribe API:

TABLE 11

Parameters for Subscribe API

| Parameter Name | Definitions |
| --- | --- |
| Contexts | One or more contexts associated with the event (e.g. physical interface, transport, mobility, etc.). |
| Events | One or more event names or identifier for subscription |

The C-MAC Event API may be employed by the C-MAC adaptation module to generate and send a notification when the subscribed event occurs, for example, to an ICN protocol module and/or a CIBUS service module. The following table lists the definitions of the parameters in the Event API:

TABLE 12

Parameters for Event API

| Parameter Name | Definitions |
| --- | --- |
| Contexts | One or more contexts associated with the event (e.g. physical interface, transport, mobility, etc.). |
| EventTypes | One or more types of occurring event (e.g. interface up, interface down, handover, etc.). |
| States | One or more event states, which may be event dependent |

The C-MAC Action API may be employed to request C-MAC to perform an operation, such as dispatch a packet, receive a packet, and/or perform mobility action (e.g. handover to another access point). The following table lists the definitions of the parameters in the Action API:

TABLE 13

Parameters for Action API

| Parameter Name | Definitions |
| --- | --- |
| Contexts | One or more contexts associated with the event (e.g. physical interface, transport, mobility, etc.). |
| Operations | One or more requested operation (e.g. dispatch, receive). |
| Data | Data associated with the requested operations. |

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g. from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Unless otherwise stated, the term "about" means±10% of the subsequent number. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network element (NE) comprising:
a plurality of physical interfaces configured to communicate with a plurality of remote NEs in an information centric network (ICN), wherein the physical interfaces comprise a first physical interface, and wherein the remote NEs comprise a first remote NE;

a receiver coupled to the physical interfaces and configured to receive, from the first remote NE and via the ICN, a service request comprising a requested service name and a requested service context, wherein the requested service name comprises a hierarchical name structure identifying a requested service, and wherein the requested service context comprises a service type attribute;

a memory configured to store:
 a service profile identifying a supported service and comprising a supported service name and a supported service context; and
 a forwarding information base (FIB);

a processor coupled to the memory and the receiver and configured to:
 generate a service response when the requested service name matches the supported service name and the requested service context matches the supported service context; and
 store in the FIB of the NE a routing path identifying the first physical interface of the NE as where the service request is received; and a transmitter coupled to the processor and configured to transmit the service response to the first remote NE according to the routing path via the ICN.

2. The NE of claim 1, wherein the processor is further configured to:
generate a second service request comprising a second requested service name and a second requested service context, wherein the second requested service name identifies a second requested service;
instruct the transmitter to transmit the second service request to the remote NEs via all of the physical interfaces and the ICN;
receive from the ICN a second service response from a second remote NE that supports a second supported service associated with a second supported service name that matches the second requested service name and a second supported service context that matches the second requested service context; and
perform self-clustering with the second remote NE without supervision from a central network management entity.

3. The NE of claim 1, wherein the processor is further configured to:
generate a second service request comprising a second requested service name and a second requested service context;
instruct the transmitter to transmit the second service request to a central management entity via at least of one of the physical interfaces and the ICN; and
receive from the ICN and the central management entity a second service response indicating that a second NE supports a second supported service associated with a second supported service name that matches the second requested service name and a second supported service context that matches the second requested service context.

4. The NE of claim 1, wherein the processor is further configured to perform name resolution by mapping a data identifier comprising a name of a data object and a context of the data object to a locator of the data object.

5. The NE of claim 1, wherein the processor is further configured to perform mobility management by:
tracking a locator of a data object based on a name of the data object and a context of the data object; and
determining a set of the physical interfaces for handover based on the name of the data object and the context of the data object.

6. The NE of claim 1, wherein the processor is further configured to perform security management by:
authorizing a data object based on a name of the data object and a context of the data object; and
authenticating the data object based on the name and the context.

7. The NE of claim 1, further comprising an application sub-system coupled to the processor and configured to generate a service request application programming interface (API) call to request an operation for a second requested service with a parameter list comprising a second requested service name and a second requested service context, wherein the processor is further configured to process the service request API call according to the second requested service name and the second requested service context, and wherein the operation comprises discovery of the second requested service, a subscription to the second requested service, a connection to the second requested service, a composition of the second requested service, an orchestration of the second requested service, or combinations thereof.

8. The NE of claim 1, wherein the receiver is further configured to receive a data object comprising a name of the data object and a context of the data object via a receiving physical interface and the ICN, and wherein the transmitter is further configured to forward the data object based on the name and the context via all of the physical interfaces except the receiving physical interface.

9. The NE of claim 1, wherein the requested service is a standalone unit of functionality and/or contents that may be consumed by an application via a formally defined interface.

10. A network element (NE) comprising:
a plurality of physical interfaces configured to communicate with a plurality of remote NEs in an information centric network (ICN), wherein the physical interfaces comprise a first physical interface, and wherein the remote NEs comprise a first remote NE;
a receiver coupled to the physical interfaces and configured to receive, from the first remote NE and via the ICN, a service request comprising a requested service name and a requested service context, wherein the requested service name comprises a hierarchical name structure identifying a requested service, and wherein the requested service context comprises a service type attribute;
a memory configured to store:
 a service profile identifying a supported service and comprising a supported service name and a supported service context; and
 a forwarding information base (FIB);
a processor coupled to the memory and the receiver and configured to:
 generate a service response when the requested service name matches the supported service name and the requested service context matches the supported service context; and
 store in the FIB a routing path identifying the first physical interface as where the service request is received;
a transmitter coupled to the processor and configured to transmit the service response to the first remote NE according to the routing path via the ICN; and
an application sub-system coupled to the processor and configured to:

generate a get request application programming interface (API) call to fetch a first data object from one of the remote NEs with a get parameter list comprising a first name of the first data object and a first context of the first data object; and generate a put request API call to publish a second data object to at least one of the remote NEs with a put parameter list comprising a second name of the second data object and a second context of the second data object, wherein the processor is further configured to:
  process the get request API call according to the first name and the first context; and
  process the put request API call according to the second name and the second context.

11. A method implemented in a network element (NE), the method comprising:
  communicating, by a plurality of physical interfaces in the NE, with a plurality of remote network elements (NEs) in an information centric network (ICN), wherein the physical interfaces comprise a first physical interface, and wherein the remote NEs comprise a first remote NE;
  receiving, from the first remote NE and via the ICN, a service request comprising a requested service name and a requested service context, wherein the requested service name comprises a hierarchical name structure identifying a requested service, and wherein the requested service context comprises a service type attribute;
  storing a service profile identifying a supported service and comprising a supported service name and a supported service context;
  storing a forwarding information base (FIB) in the NE;
  generating a service response when the requested service name matches the supported service name and the requested service context matches the supported service context;
  storing, in the FIB of the NE, a routing path identifying the first physical interface of the NE as where the service request is received; and
  transmitting the service response to the first remote NE according to the routing path and via the ICN.

12. The method of claim 11, further comprising:
  generating a second service request comprising a second requested service name and a second requested service context, wherein the second requested service name identifies a second requested service;
  instructing transmission of the second service request to the remote NEs via all of the physical interfaces and the ICN;
  receiving from the ICN a second service response from a second remote NE that supports a second supported service associated with a second supported service name that matches the second requested service name and a second supported service context that matches the second requested service context; and
  performing self-clustering with the second remote NE without supervision from a central network management entity.

13. The method of claim 11, further comprising:
  generating a second service request comprising a second requested service name and a second requested service context;
  instructing transmission of the second service request to a central management entity via at least of one of the physical interfaces and the ICN; and receiving from the ICN and the central management entity a second service response indicating that a second NE supports a second supported service associated with a second supported service name that matches the second requested service name and a second supported service context that matches the second requested service context.

14. The method of claim 11, further comprising performing name resolution by mapping a data identifier comprising a name of a data object and a context of the data object to a locator of the data object.

15. The method of claim 11, further comprising performing mobility management by:
  tracking a locator of a data object based on a name of the data object and a context of the data object; and
  determining a set of the physical interfaces for handover based on the name of the data object and the context of the data object.

16. The method of claim 11, further comprising performing security management by:
  authorizing a data object based on a name of the data object and a context of the data object; and
  authenticating the data object based on the name and the context.

17. The method of claim 11, further comprising:
  generating a service request application programming interface (API) call to request an operation for a second requested service with a parameter list comprising a second requested service name and a second requested service context; and
  processing the service request API call according to the second requested service name and the second requested service context, wherein the operation comprises discovery of the second requested service, a subscription to the second requested service, a connection to the second requested service, a composition of the second requested service, an orchestration of the second requested service, or combinations thereof.

18. The method of claim 11, further comprising:
  generating a get request application programming interface (API) call to fetch a first data object from one of the remote NEs with a get parameter list comprising a first name of the first data object and a first context of the first data object;
  generating a put request API call to publish a second data object to at least one of the remote NEs with a put parameter list comprising a second name of the second data object and a second context of the second data object;
  processing the get request API call according to the first name and the first context; and
  processing the put request API call according to the second name and the second context.

19. The method of claim 11, further comprising:
  receiving a data object comprising a name of the data object and a context of the data object via a receiving physical interface and the ICN; and
  forwarding the data object based on the name and the context via all of the physical interfaces except the receiving physical interface.

20. The method of claim 11, wherein the requested service is a standalone unit of functionality and/or contents that may be consumed by an application via a formally defined interface.

* * * * *